Aug. 11, 1936.  L. H. PEEPLES  2,050,543
SPRING HOLDING ATTACHMENT FOR AUTOMOBILES
Filed Sept. 13, 1935   3 Sheets-Sheet 3
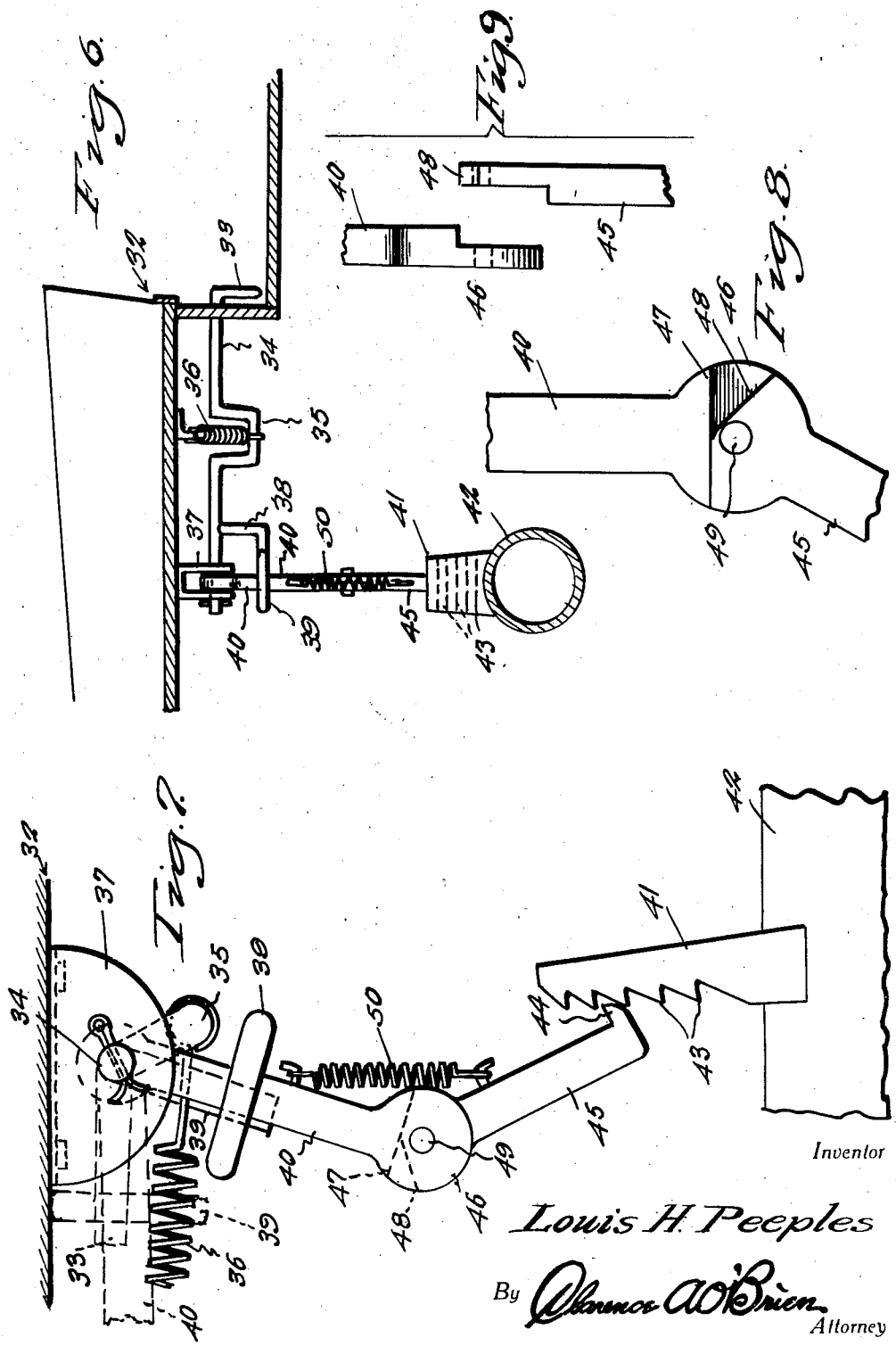
Inventor
Louis H. Peeples
By Clarence A. O'Brien
Attorney Patented Aug. 11, 1936

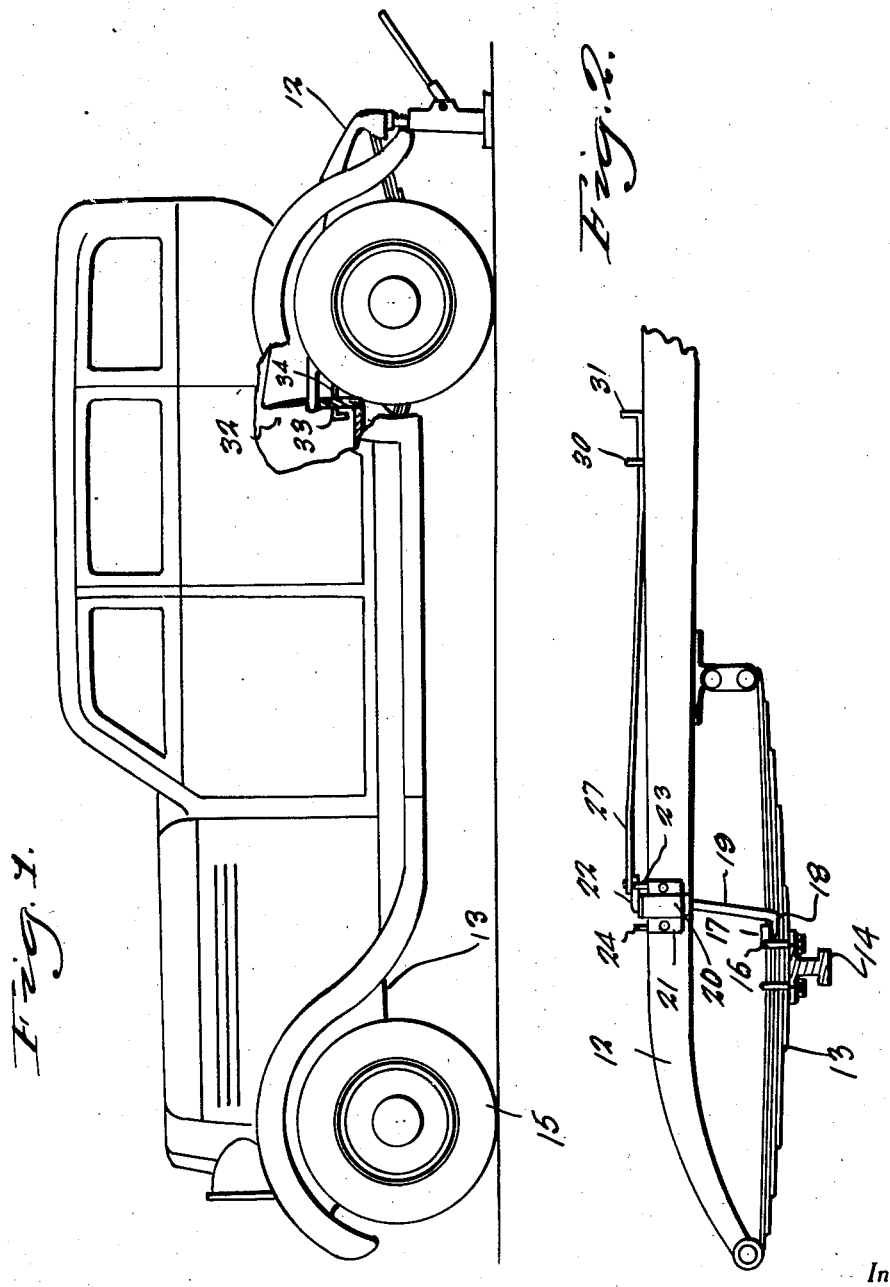

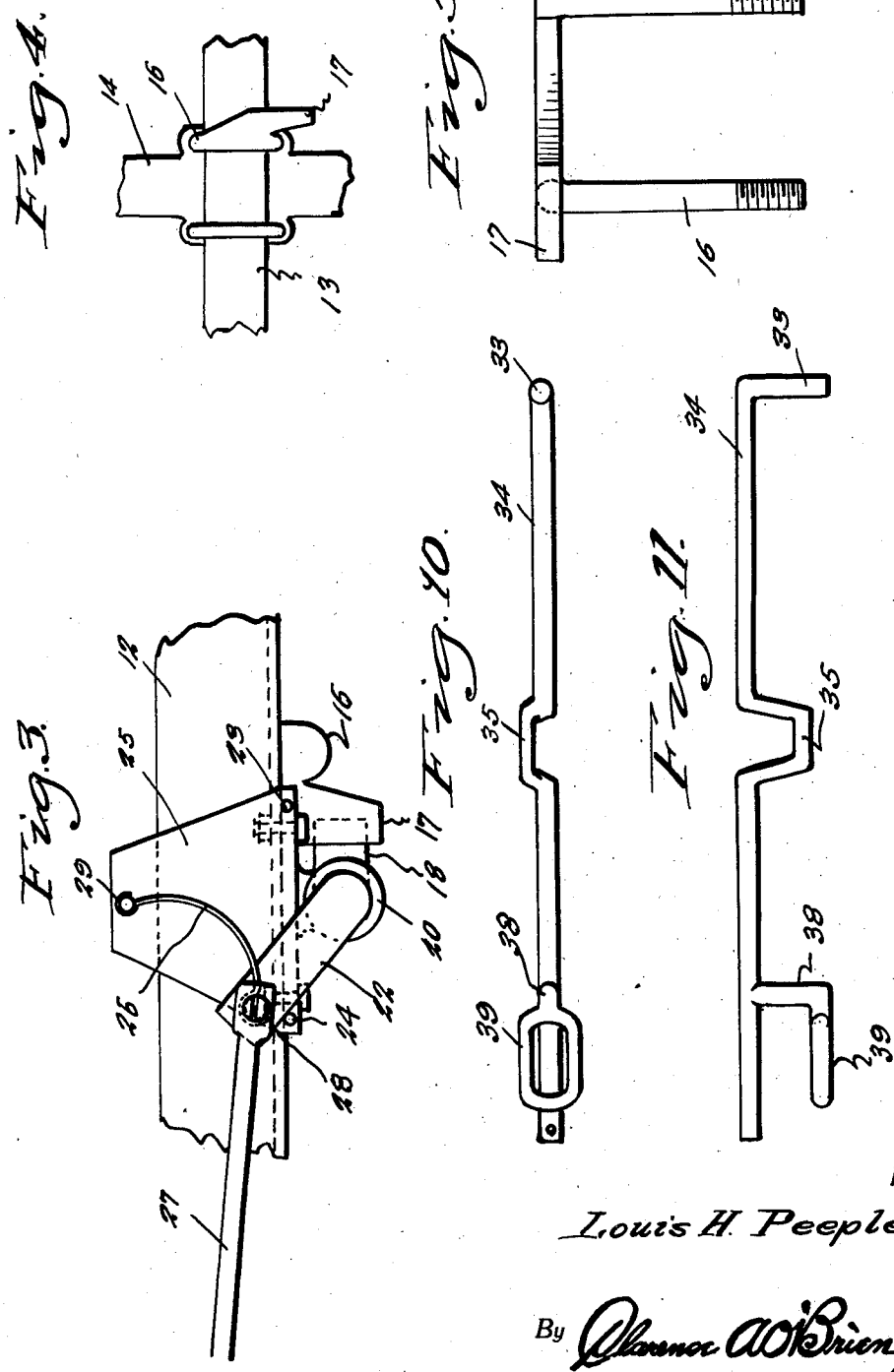

2,050,543

UNITED STATES PATENT OFFICE 2,050,543

SPRING HOLDING ATTACHMENT FOR AUTOMOBILES

Louis H. Peeples, Overton, Tex.

Application September 13, 1935, Serial No. 40,479

5 Claims. (Cl. 280—150)

The present invention relates to that field of special automobile attachments and equipment now generally referred to as automotive accessories and appliances and has reference in particular to manually adjusted and controlled means for maintaining the conventional semi-elliptical leaf spring in a predetermined compressed state in such a way as to temporarily join the spring and underslung wheel structure in a manner to expedite jacking up a wheel directly from the chassis frame.

All who operate present day automobiles have doubtless experienced the difficulty of handling standard hoisting and lifting jacks when making tire and wheel repairs and adjustments. Almost invariably in prevailing automobile construction the transverse front and rear axles are located well under the body of the car, in fact so far under as to make it difficult to place the jack beneath the axle or to thereafter remove it. Numerous types of jacks and reach rods and handles are provided in an effort to overcome this hazardous and inconvenient task. Under the circumstances and confronted with this problem I have attempted to find a practical way of accomplishing the desired result by simply placing the lifting jack beneath and engaging it directly with either the front or rear end of the chassis frame.

Although the practice of placing the jack underneath the extreme end of the chassis frame is not broadly new it is evident that it requires an unusually long range jack for adequate hoisting. Even then when the chassis is lifted up the springs bow downwardly due to the hanging weight of the axle and wheels thereon. It follows that this is the main objection to overcome and I have therefore perfected a means which is interposed either between the chassis or the body and the intermediate portion of the conventional leaf spring to temporarily connect the spring with the body and to flatten the spring, so to speak, so that as the chassis is jacked up the spring, axle and wheels go up with it.

In reducing my inventive idea to practice I have found it expedient and practical to provide an arrangement which comprises broadly a suitably mounted mechanically actuated manually controlled hook which is temporarily and releasably engageable with keeper means on the axle and wheel assembly so as to compress and thereby straighten out the spring and to provide a positive joining and lifting connection between the spring and body, whereby my improved method of hoisting the car is satisfactorily carried into effect.

Other features and advantages will become more readily apparent from the following description and drawings.

In the drawings:

Figure 1 is a side elevational view of a conventional automobile with a portion in the rear broken away to disclose features of the invention and to show how the jack is used in accordance with my idea.

Figure 2 is a view primarily in elevation and partly in section showing the front spring and axle assembly and indicating the embodiment of the invention used at this end of the structure.

Figure 3 is an enlarged fragmentary top plan view illustrating the principal features disclosed in Figure 2.

Figure 4 is a top plan view showing the special spring clip with its properly designed keeper lug.

Figure 5 is a view of the clip per se.

Figure 6 is a view primarily in elevation showing the means or embodiment of the invention used at the rear end of the automobile for the purpose of connecting the rear axle and spring (not shown) with the body to accomplish the desired jacking results.

Figure 7 is an assembly view disclosing the essential features of the hook means shown on a smaller scale in Figure 6.

Figure 8 is a view illustrating the rule-type joint used between the pivoted hook and rocker arm.

Figure 9 is an edge view of the arm and hook separated adjacent their adjoining ends.

Figure 10 is a top plan view of the especially designed rocker shaft.

Figure 11 is an enlarged edge elevation of the same.

It is evident from the explanation thus far that in accordance with my idea it is necessary to provide one embodiment of the invention for the front end spring and axle structure and a different type at the rear end. Although I will not attempt at this stage in the description to disclose the features which are akin to each other and while I will not attempt to give a generic résumé, I will proceed to describe first the structure shown in Figures 1 to 5 inclusive and thereafter describe the other embodiment shown in the remaining Figures 6 to 11. Proceeding with this in mind I feel disposed to mention first Figure 2 wherein the channel bar of the chassis frame is denoted by the numeral 12. Under this is the usual longitudinal semi-elliptical leaf spring 13 and attached to this by a conventional clip is the transverse axle 14 carrying the front wheel 15. The spring, wheel and axle assembly is of customary form. The attachment which constitutes the means of joining the spring 13 to the chassis bar 12 comprises one part mounted on the axle and spring and another part on the chassis. Incidentally the details at the front of the opposite side of the machine are the same and a description of one attachment will suffice for both devices.

Calling attention now to Figure 5 it will be observed that one of the spring clips, that is the one indicated by numeral 16, is provided with an integral extension or finger 17 which constitutes a keeper lug. Hereinafter this is referred to broadly as keeper means. Cooperable with this is the properly shaped bill 18 of a part which may be broadly and unitarily referred to as a pivoted or swingable hook 19. The stem of the hook is mounted for oscillation in a bearing 20 forming a part of an attaching bracket or mounting 21 suitably mounted to the chassis bar. The upper end of the shank or stem of the hook is bent laterally as indicated at 22 to form an oscillating or rocker arm. The movement of this in opposite directions is limited by the two stop pins 23 and 24 carried by the top plate 25 of the fixture as shown in Figure 3. As also shown in Figure 3 the numeral 26 designates a spring attached to the pivoted end of a push-pull rod 27 as indicated at 28. This spring is anchored at its opposite end on the plate 25 as indicated at 29. Its function is to hold the rocker arm 22 in either of its two extreme positions, that is against the pin 24 or the pin 23 as the case may be. In other words the spring automatically bows itself so as to accomplish this result. Consequently it keeps the parts engaged in one position and disengaged in the other position. The rod 27 is mounted above the chassis bar 12 and extends through a guide bracket 30 and terminates in a finger piece 31. In practice the features 30 and 31 are located beneath the hood of the automobile so that by raising one side of the hood the finger grip 31 is accessible to permit convenient operation of the rod 27. In this connection I might point out that the lower end portion including the hook 19 is offset slightly, that is laterally offset with respect to the longitudinal dimension or axis as shown in Figure 2. This is to permit the hook 19 to swing clear of the keeper lug 17 when it is disengaged therefrom. It is evident that these features 17 and 18 are normally disengaged while the car is in motion. When it is desired to jack the car up from the front all that is necessary is to raise the hood and to adjust the rod 27 so as to swing the bill 18 of the hook 19 underneath the keeper lug 17. In so doing the spring 13 is held in a substantially flat, that is non-bowed, state. Hence by placing the jack under the extreme front end of the chassis bar 12 and operating it the spring, axle and adjacent wheel is lifted as a unit. Consequently, a relatively short conventional lifting jack will suffice for lifting the wheel clear of the ground a distance sufficient to make for repairs and tire exchange.

Basically, the same idea is utilized at the rear end of the vehicle. Referring to Figure 6 I call attention to the numeral 32 which designates the rear seat and it will be observed that the lateral finger grip or handle 33 of the rocker shaft 34 is conveniently associated therewith. This puts it in a position so that by reaching down the user can get hold of the handle or lever 33 and turn it to oscillate the shaft 34. The shaft 34 has a crank intermediate its ends as indicated at 35 and a return spring 36 is connected with this and anchored on the body. The opposite end of the rocker shaft is mounted for oscillation in an appropriate U-shaped hanger bracket 37. A substantially L-shaped part is carried by the rocker shaft and includes a depending member 38 terminating in a horizontal eye or link 39 which embraces a depending rocker arm 40. This rocker arm loosely surrounds the adjacent end of the rocker shaft and is confined in the hanger bracket 37 as shown in Figures 6 and 7. By oscillating the rocker shaft through the instrumentality of the handle 33 this swings the arm 40 in either direction as is obvious.

In this arrangement the keeper means comprises a special adaptor element 41 mounted rigidly on the rear axle 42. This extends upwardly and is provided on one face with rack or keeper teeth 43. The bill 44 of the hook 45 is fashioned especially to engage the inclined teeth 43. The lower end of the arm 40 terminates in a disk-like head 46 provided with a stop shoulder 47 with which a similar shoulder 48 on the segmental head of the hook cooperates. The two heads are pivoted together as indicated at 49 to form a sort of a rule joint. The numeral 50 designates a coil spring which bridges the joint and is anchored at one end of the intermediate portion of the arm 40 and at the opposite end on the intermediate portion of the swingable hook 45. The tension of the spring 50 is such as to normally keep the arm and hook in approximate obtuse angular relationship normally as indicated in Figure 7. It is possible however by proper mechanical stress to change the relationship of the parts so that the hook 45 swings into longitudinal alinement with the arm 40. This position is not shown but is the final adjusted position when the bill 44 is engaged with the keeper teeth 43. Spring 50 is a sort of compensating or safety means which will be described later.

Under normal circumstances the coiled spring 36 exerts a stress or pull on the oscillatory rocker shaft 34 to actuate the parts to disengage the hook 44 from the keeper means 41. Under the circumstances the special rule joint between the parts 40 and 41 maintains them, due to the action of the spring 50 in substantially obtuse angular relationship. By grasping the finger piece 33 and operating the rocker shaft in the proper direction the link 39 swings against the arm 40 to adjust it in a direction towards the keeper means 41. As it is pulled over in this direction the spring 50 stretches and allows the hook 45 to gradually straighten out and the bill 44 to engage the proper one of the teeth 43. As a general proposition the part 45 will straighten out into longitudinal alinement with the arm 40 at which time we have a hooked connection between the axle 42 and the body of the car which functions the same as the arrangement shown in Figure 2. In other words it holds the leaf spring comparatively straight at this time and joins it temporarily to the car so that by lifting the car, the spring, axle and wheels go up with it.

Should the user forget to disengage the rear hook 44 it is evident that when the car is again lowered and weight is brought to bear on the spring, that is the leaf spring, at the rear, this will raise up the keeper 41 sufficiently to disengage it from the hook 44. As soon as it is disengaged the spring 36 then comes into play to pull it in a lateral direction away from the teeth 43 and spring 50 also comes into play to adjust the parts 45 and 40 back to the same position as shown in Figure 7. This is an automatic safety feature to which, it is believed, is necessary in a device of this kind.

Generically observed, it will be noted that both embodiments of the invention are characterized by features in common. In other words in both forms we have suitable keeper means (17 in Figure 2 and 41 in Figure 7) either mounted on or carried by the front or rear axle as the case may be. In both embodiments we have the manually controlled means (27 in Figure 2 and 33 and 34 in Figure 6) for controlling and actuating the hook means. The hook means appears broadly in both forms of the invention where it is made up of a single hook member as shown in Figure 2 or as a sectional hook construction as shown in Figure 7. Thus we have a swingable hook properly mounted on either the chassis or body as the case may be and manual means and keeper control means. I mention these factors in order that the following generic claims may be better appreciated.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

What is claimed is:

1. In a structural assemblage of the class described, in combination, a body having bearing means, a rocker shaft mounted for oscillation in said bearing means and having a handle at one end, spring retaining means for said rocker shaft, a rocker arm associated with the shaft, an operating connection between the rocker arm and shaft, and a hook pivotally mounted on the lower end of said rocker arm.

2. In a structural assemblage of the class described, in combination, a body having bearing means, a rocker shaft mounted for oscillation in said bearing means and having a handle at one end, spring retaining means for said rocker shaft, a rocker arm associated with the shaft, an operating connection between the rocker arm and shaft, and a hook pivotally mounted on the lower end of said rocker arm, together with a spring fastened to the intermediate portions of the rocker arm and hook respectively to serve in the manner and for the purposes described.

3. In a structure of the class described, a hanger bracket, a rocker arm having operating means at one end and associated with said bracket, spring return means cooperable with the rocker arm, a hook having pivoted rule joint connection with the lower end of said rocker arm, and safety spring means associated with the rule joint and said hook and arm respectively.

4. In a structural assemblage of the class described, in combination, a vehicle body, a bearing and hanger bracket rigidly but detachably mounted on the body at a predetermined point, a wheel-equipped axle disposed beneath the body, a temporarily usable relatively fixed multiple toothed keeper member on the axle located in a line approximately beneath said bracket, a sectional depending axle suspension and spring retention device pivotally hung from said bracket and movable in relation to the bracket and keeper member, spring means connected with said device and serving normally to disengage the device from the keeper member and to hold said device in an elevated out-of-the-way position, said spring means having the additional function of maintaining the device yieldably engaged with the keeper member during the axle lifting operation, and manually actuated rocker shaft means freely connected with said device to release the device at a predetermined and opportune time.

5. In a structure of the class described, in combination, a vehicle body, a wheel-equipped axle arranged beneath said body, an upstanding toothed keeper element caried by said axle, a hanger bracket mounted on the body above said keeper element, a horizontally disposed rocker shaft mounted for rotation on said body and provided at one end with a finger grip, a coiled spring anchored on the body and attached to said rocker shaft, a vertical rocker arm swingably connected at its upper end with said hanger bracket, an operating connection between the rocker arm and rocker shaft, a hook pivotally connected to the lower end of said rocker arm, and spring means attached at one end to the rocker arm and at its opposite end to the hook.

LOUIS H. PEEPLES.